(12) United States Patent
Ito et al.

(10) Patent No.: US 7,363,883 B2
(45) Date of Patent: Apr. 29, 2008

(54) GAS ENGINE ELECTRIC POWER GENERATING SYSTEM EFFECTIVELY UTILIZING GREENHOUSE GAS EMISSION CREDIT

(75) Inventors: Kuninori Ito, Yokohama (JP); Michio Abe, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 572 days.

(21) Appl. No.: 10/803,975

(22) Filed: Mar. 19, 2004

(65) Prior Publication Data

US 2005/0205022 A1    Sep. 22, 2005

(51) Int. Cl.
  *F02B 43/00* (2006.01)
  *F02B 43/10* (2006.01)
  *F02B 13/00* (2006.01)
(52) U.S. Cl. .................. 123/3; 123/527; 123/575
(58) Field of Classification Search .......... 123/3, 123/27 GE, 527, 575
  See application file for complete search history.

(56) References Cited

U.S. PATENT DOCUMENTS 6,176,224 B1 * 1/2001 Wu et al. .................. 123/527
6,578,559 B2 * 6/2003 Kilmer .................... 123/527
6,595,001 B2 * 7/2003 Rautenbach et al. ........ 60/772
2003/0188714 A1 * 10/2003 Yamamoto et al. ......... 123/435

FOREIGN PATENT DOCUMENTS

WO    2002/079629    10/2002

OTHER PUBLICATIONS

Ryoji Nakano, et al., "Development of High Power KU30GA Gas Engine", Oct. 2001, vol. 38 No. 3, pp. 141-145.

* cited by examiner

*Primary Examiner*—Stephen K. Cronin
*Assistant Examiner*—Ka Chun Leung
(74) *Attorney, Agent, or Firm*—Wenderoth, Lind & Ponack, L.L.P.

(57) ABSTRACT

A gas engine electric power generating system in which an electric power generating apparatus including an electric power generator connected with a gas engine of a pilot fuel oil ignition type is installed near a coal mine. Recovered methane gas and ventilated methane gas from the mine are introduced into a cylinder of the gas engine while being adjusted to be introduced as a lean methane/air mixture to operate the engine to produce electric power. A carbon dioxide emission credit reflecting the difference in greenhouse effect index between releasing coal mine methane gas to the atmosphere and releasing the methane gas to the atmosphere as carbon dioxide, is registered on an emission credit market. Also included are the affiliated systems of mutual patronage relation constituted by one or a plurality of the systems and nearby power generating system or systems using coal bed methane or pre-mining gas as fuel.

6 Claims, 7 Drawing Sheets

Fig.7

| | METHANE RELEASE (PRESENT) (Mm³/y) | A CASE THE INVENTION APPLIED ||||
|---|---|---|---|---|---|
| | | METHANE UTILIZED (Mm³/y) | POWER GENERATION CAPACITY (MW) | GENERATED POWER (億 kWh/y) | REDUCTION OF GHG (kt/y) |
| 1 CHINA | 14,400 | 5,400 | 2,430 | 210 | 97,000 |
| 2 CIS | 4,200 | 1,600 | 720 | 60 | 29,000 |
| 3 U.S. | 4,300 | 1,000 | 450 | 40 | 18,000 |
| 4 OTHER DEVELOPED COUNTRIES | 6,700 | 2,100 | 950 | 80 | 38,000 |
| 5 OTHER DEVELOPING COUNTRIES | 3,500 | 1,400 | 630 | 60 | 25,000 |
| TOTAL | 33,100 | 11,500 | 5,180 | 450 | 207,000 |

GAS ENGINE ELECTRIC POWER GENERATING SYSTEM EFFECTIVELY UTILIZING GREENHOUSE GAS EMISSION CREDIT

BACKGROUND OF THE INVENTION

1. Field of the Invention

The present invention relates to a gas engine electric power generating system. The system effectively utilizes coal mine methane gas which is low in methane concentration and large in its variation by the gas engine electric power generating system. Using coal mine methane gas also facilitates advancing economic development in developing countries by enabling these countries to profit from coal mine methane gas based electric power generation and also GHG (greenhouse gas) emission dealing.

2. Description of the Related Art

In growing awareness of a worldwide environmental problem, country-by-country objectives regarding reduction of carbon dioxide emissions were decided at the 3$^{rd}$ Conference of the Parties to the United Nations Framework Convention on Climate Change held in 1997 in Kyoto. In the meeting, a Kyoto mechanism was established for the reduction of GHG ($CO_2$, $CH_4$, $N_2O$, etc.) emissions in accordance with the conditions of countries and for the promotion of the efficiency of reduction.

The Kyoto mechanism is a system to promote worldwide cooperation and emission credit dealing for the reduction of GHG. A concept of carbon dioxide emission credit (right to emit a certain amount of carbon dioxide) was introduced and which aims to utilize market principles as a supplementary scheme for achieving the reduction objective of each country. When each entity (nations, enterprises, stores, families, etc.) takes action of directly exhausting GHG (for example, consuming energy for operating machines, consuming gasoline for running vehicles, etc.) or when it takes action of indirectly exhausting GHG (for example, mining of coal, selling of gasoline, etc.), it is assumed that each entity is under an obligation to bear carbon dioxide emission credit corresponding to the exhausted amount of GHG.

As for energy, coal industries of major coal yielding nations of the world (China, CIS, Europe, and the United States, etc.) are expected to play an important roll as energy suppliers even in the middle part of this century.

However, in proportion to the coal production, methane gas of 10~40 Nm$^3$ (in terms of pure methane) per ton of coal is released to the atmosphere as recovered methane gas (30~50% concentration, air diluted) and ventilated methane gas (0.3~0.7% concentration, air diluted). Therefore, technology and business to effectively utilize the methane gas now being released to the atmosphere are very prospective and will make large social and economic contributions.

For example, the amount of coal mine methane gas released by countries & districts is; China 14,400(206), CIS 4,200(60), and other developing countries 3500(50) totaling to 22,100(316), which is over twice the total 11,000(157) of developed countries. (Units are in million m$^3$/year, numbers in parentheses are the values converted to carbon dioxide in million tons/year). Utilizing the mine methane gas of developing countries is very advantageous for emission credit trading.

There are two kinds of coal mine methane gas as shown in FIG. 5. One is recovered methane gas recovered by a vacuum pump from bore holes for degassing for safety, and the other is ventilated methane gas exhausted together with the ventilation air from mine shafts and coal seams. The concentration of methane in these gases is low. For example, that of the former is 30~50% and that of the latter is extremely low at 0.3~0.7%.

To use a boiler or gas turbine as a heat engine to utilize methane gas has been considered.

However, if recovered methane gas having a methane concentration of 30~50% is to be used for a gas turbine or boiler, as combustion temperature is low and methane concentration varies from time to time, it is not practical. It is difficult to use even the recovered methane gas for a gas turbine. Actually, the usage of recovered methane gas has been limited to use as a fuel by nearby households, or in the case of a boiler used only as auxiliary fuel.

Therefore, regarding the utilization of coal mine methane gas, even recovered methane gas is seldom utilized, and almost all of the coal mine methane gas is released to the atmosphere.

However, the greenhouse effect index (here and hereafter, this term is identical to "global warning potential") of methane gas is 21 times that for methane gas that is burnt and released to the atmosphere as $CO_2$. For example, coal mine methane gas release in China is 14.4 billion m$^3$, which is equivalent to more than 10% of total amount of $CO_2$ release in Japan.

Therefore, if Japan establishes an enterprise to effectively consume the coal mine methane gas in China to change the methane gas to $CO_2$ and release to the atmosphere as $CO_2$, a reduction of greenhouse effect index can be achieved. More specifically, a green house effect index of 20 may be realized by burning the methane gas and then releasing the combusted gas to the atmosphere, versus releasing the methane gas directly to the atmosphere. A greenhouse effect index of 20 is realized because burning methane yields a greenhouse effect index for $CO_2$ of 1 and directly releasing methane gas to the atmosphere yields a greenhouse effect index of 21. Thus, taking the difference between these greenhouse effect indices, i.e. 21-1, yields a reduction of greenhouse effect index equal to 20. This reduction of greenhouse effect index can be traded as an emission credit.

For example, if developing countries such as China, CIS, etc. start business to effectively consume coal mine methane gas through receiving finance or loan aid from the Asian Development Bank, the World Bank, or ODA of Japan, etc., the enterprising body can make profits from the enterprise and also can make profits by selling $CO_2$ emission credit to a surcharge payment obligator. This surcharge system is a system that a country (government) for example levies a toll on each enterprise for its releasing of carbon dioxide. There are two methods, one is that the surcharge is added to fuel price, the surcharge being proportional to the amount of carbon dioxide emission calculated from the amount of primary energy, and the other is that the surcharge is levied at the time carbon dioxide is actually released.

SUMMARY OF THE INVENTION

The present invention is made to solve the problem mentioned above, and an object is to provide an art on the basis of which can be established an enterprise which effectively utilizes coal mine methane gas having a low concentration of methane and large in its variation and which serves to smoothly advance the economic development in developing countries by mortgaging GHG emission credit for financing or loan aid utilizing $CO_2$ emission credit trade system.

Another object of the present invention is to achieve the above-mentioned object by effectively utilizing the gas engine equipped with a combustion diagnosis apparatus that the present applicant developed (see WO02/079629).

First, the structure of the principal part of the gas engine used for the present invention will be explained with reference to FIG. 1. In FIG. 1, the reference numeral 20 is the main body of a gas engine. A pilot fuel ignition device 11 comprising an injection nozzle 11b and a sub-chamber 11c is mounted in the upper part of the combustion chamber 44 formed by a cylinder and piston, flame jet 44a being injected from said sub-chamber 11c into the combustion chamber 44, recovered methane gas and ventilated methane gas being mixed in the inlet pipe 9 before entering into the combustion chamber 44. Reference numeral 41 is the inlet valve.

As the gas engine used in the present invention is a pilot ignition engine and the ignition of the gas fuel in the combustion chamber 44 occurs through the flame jet 44a injected from the sub-chamber 11c, very lean mixture of methane of 10% or lower, preferably 3~5%, or 3~4% can be ignited. Therefore, recovered methane gas of methane concentration of 30~50% and ventilated methane gas of methane concentration of 0.3~0.7% are mixed in the inlet pipe before entering into the combustion chamber 44 to be reduced to lean mixture of 4~5% methane by means of a combustion control apparatus 200.

In this case, it is preferable to control so that excess air ratio is approximately 2.

With the gas engine, very lean mixture of methane can be ignited and engine performance can be improved.

To cope with the combustion of very lean methane mixture and from time to time changing methane concentration, the gas engine is equipped with a combustion diagnosis apparatus 100, by virtue of which misfire and knocking can be evaded.

In this way, the operation method of a gas engine can be established, by which coal mine methane gas that changes from time to time in methane concentration can be effectively utilized by proper combination of recovered methane gas and ventilated methane gas.

By connecting an electric power generator to the gas engine, profit form electric power production can be made.

The exhaust gas of the gas engine can be utilized for producing steam and then released to the atmosphere. Thus, coal mine methane gas is changed to carbon dioxide by the combustion in the gas engine and released to the atmosphere, so that reduction of greenhouse effect index of 20 can be achieved in comparison to releasing methane gas to the atmosphere. This is because releasing methane gas to the atmosphere has a greenhouse effect index of 21, whereas the greenhouse effect index of $CO_2$ is 1. This reduction of greenhouse effect index can be traded as an emission credit.

The enterprising body planning to establish the gas engine electric power generating system near a coal mine can secure financing if carbon dioxide emission credits are mortgaged during the application for financing or loan aid to the Asian Development Bank or ODA of Japan, etc. It should be understood that financing may be made under the condition that the enterprising body establishes the gas engine electric power generating plant at a coal mine, for example, in a developing country.

The enterprising body reports to the U.N. or the Japanese Government, etc. the $CO_2$ emission reductions to be achieved by the difference 20 of greenhouse effect index of methane and $CO_2$. The enterprising body and can register this carbon dioxide emission credit on the emission credit market to prepare for trading with credit surcharge payment obligators. The purchaser of $CO_2$ emission credits may be other than the Japanese Government.

After securing financing from the Asian Development Bank, etc., the enterprising body purchases the principal parts and assembles the gas engine electric power generating system.

The enterprising body can get not only profit through selling the electric power produced by the operation of the gas engine electric power generating system, but also through the reduction of 20 times the greenhouse effect index of carbon dioxide. With the profit obtained by selling the carbon dioxide emission credit to surcharge payment obligators on the market, the loan can be paid-off in a short period. As a result, the enterprising body can get profit dually and promote economic development in developing countries by effectively utilizing $CO_2$ emission credits, i.e. mortgaging $CO_2$ emission credit for securing financing or loan aid. There may be the case that $CO_2$ emission credit is not necessary as a mortgage for securing financing or loan aid for the project of establishing the gas engine electric power generating plant, for there may be a fund that invests on the basis of prospective investment return.

BRIEF DESCRIPTION OF THE DRAWINGS

FIG. 7 is a table showing the electric power production and carbon dioxide reduction by region when utilizing the business model of FIG. 6.

DETAILED DESCRIPTION OF THE PREFERRED EMBODIMENTS

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 2:
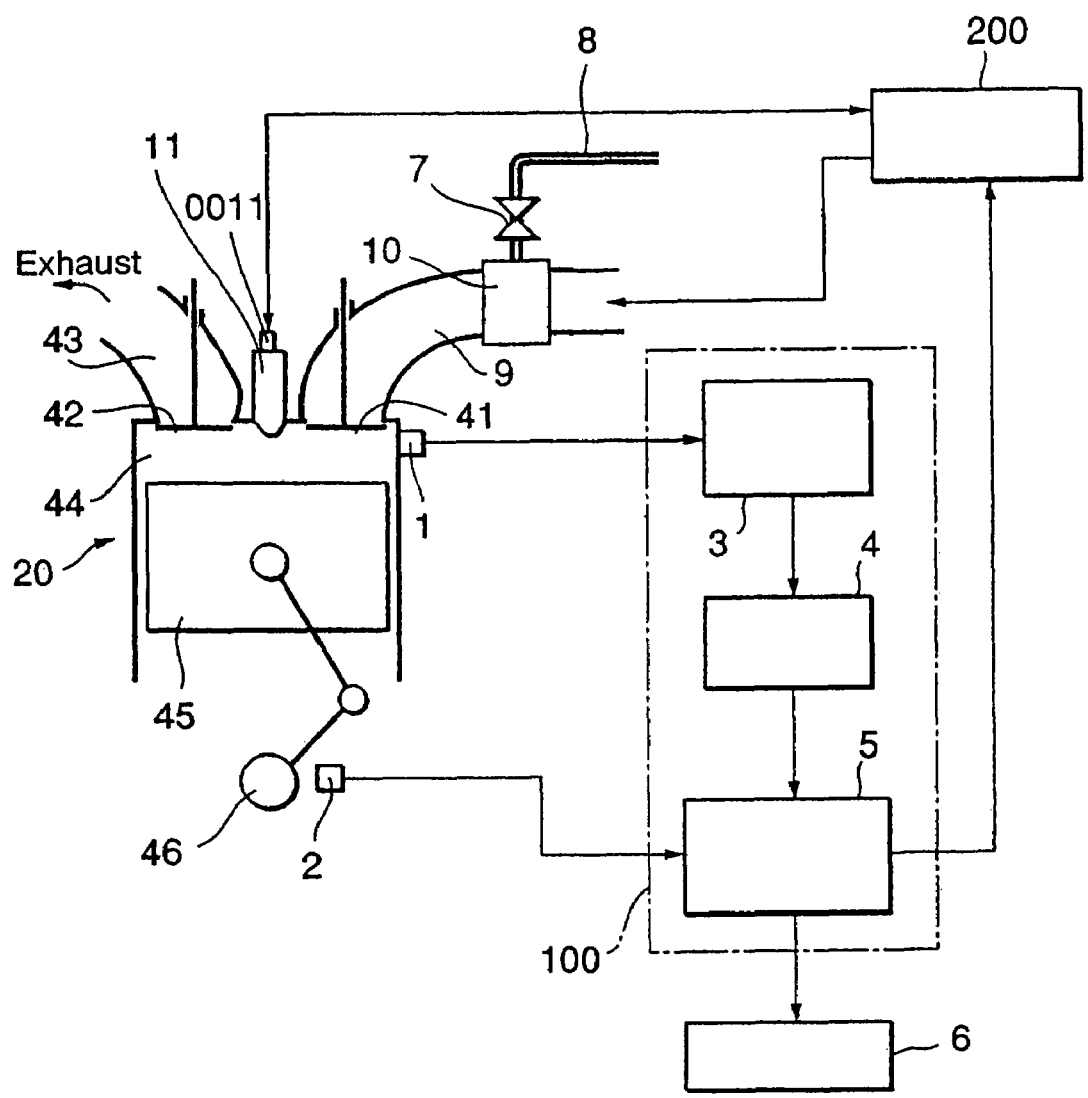
FIG. 2 is a diagrammatic representation showing the total configuration of the gas engine for utilizing coal mine methane gas in the system according to the present invention.

FIG. 2 shows the total configuration of the gas engine. Reference number 20 is the main body of a gas engine, 45 is a piston, 46 is a crankshaft, 44 is a combustion chamber, 41 is an inlet valve, 42 is an exhaust valve, and 43 is an exhaust pipe.

Reference number 9 is an inlet pipe. A recovered methane gas injection device 10 is provided midway along inlet pipe 9 for injecting recovered methane gas into the ventilated methane gas flowing in inlet pipe 9.

Reference number 8 is a gas supply pipe for connecting a recovered methane gas tank (not shown) accommodating recovered methane gas and sgas injection device 10. Reference number 7 is a gas supply electromagnetic valve provided at the entrance of gas supply pipe 8 to enter into gas injection device 10. A combustion control device 200, which is detailed later, receives the signal of detected methane concentration from a recovered methane gas concentration detector, and electromagnetic valve 7 is controlled under the control signal from combustion control device 200 to be shut-off or adjusted.

Figure 1:
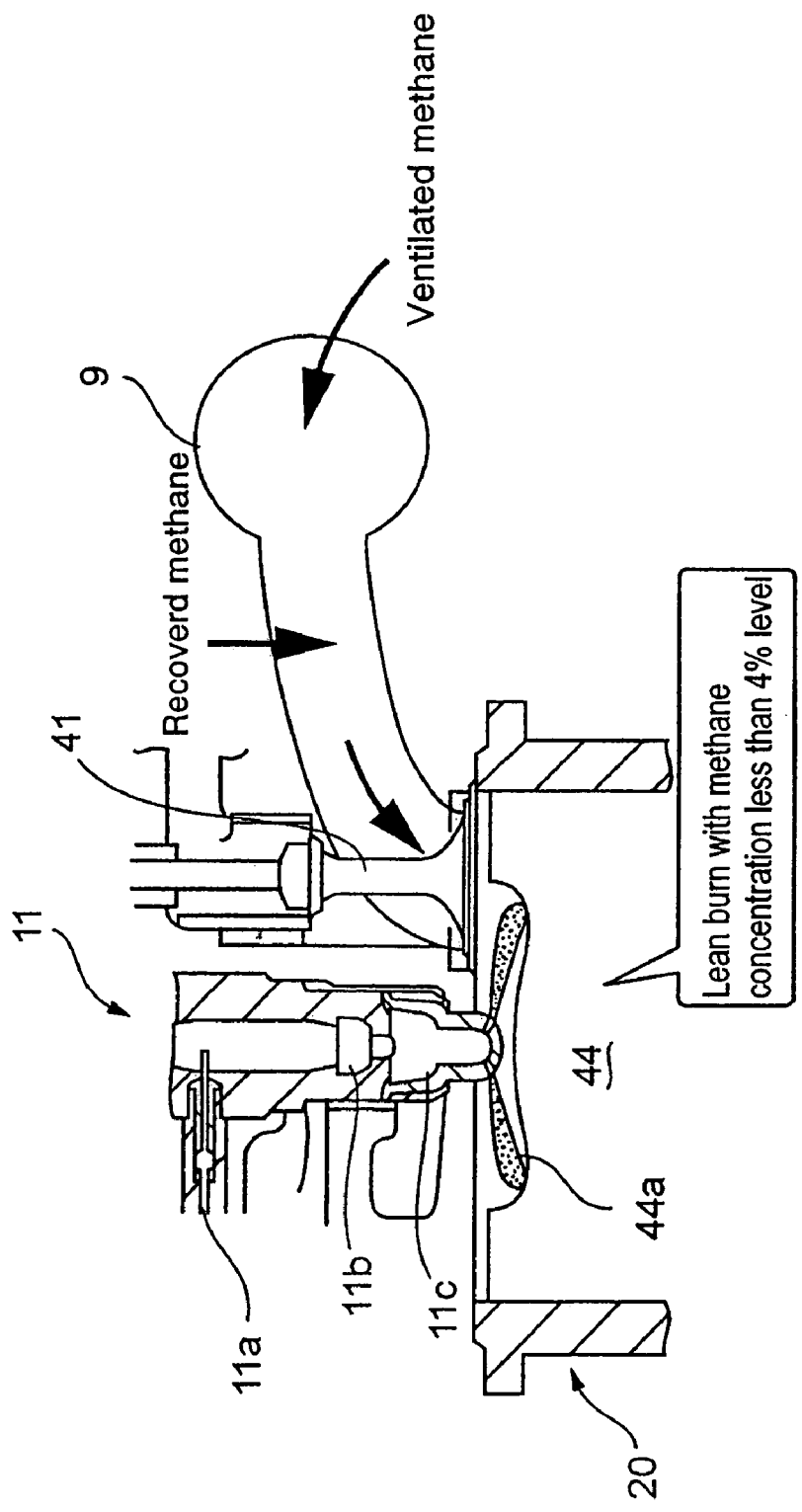
FIG. 1 is a schematic cross-sectional view of the structure of the principal part of the gas engine for utilizing coal mine methane gas in the system according to the present invention.

Reference number 11 is an ignition device for torch-igniting the pilot fuel oil injected into a sub-chamber (see FIG. 1) from a pilot fuel injection valve 0011 to promote the combustion of lean methane gas/air mixture in the main combustion chamber.

The gas pressure in the combustion chamber, i.e. cylinder pressure is detected with a cylinder pressure detector 1, and crank angle is detected with a crank angle detector 2.

Reference number 100 is a combustion diagnosis apparatus composed of a noise filter 3, an amplifier 4 for amplifying the cylinder pressure signal passed through the noise filter, and a combustion diagnosis section 5. The noise filter 3 and amplifier 4 are not necessarily required for constituting the system.

Noise filter 3 is composed of a low-pass filter for filtering out the noise on the signal inputted from cylinder pressure detector 1. Combustion diagnosis section 5 diagnoses the combustion condition in combustion chamber 44 on the basis of the cylinder pressure signal amplified by amplifier 4 with the assistance of the crank angle signal from crank angle detector 2.

The combustion control device 200 receives the signal of the result of diagnosis at combustion diagnosis section 5, and shuts off or controls the opening of gas supply electromagnetic valve 7 and also controls the action of ignition device 11 based on the diagnosis result signal. The result of diagnosis by combustion diagnosis section 5 is displayed on a displaying apparatus 6.

During operation of the methane gas engine of this configuration, when pilot fuel is allowed to ignite in ignition device 11 and a gas valve (not shown) is opened, recovered methane gas from a recovered methane gas tank (not shown) is supplied to gas injection device 10, such that the recovered methane gas is adjusted in pressure by a gas pressure adjusting device (not shown). By opening gas supply electromagnetic valve 7, the recovered methane gas is injected into ventilated methane gas flowing through gas injection device 10 provided midway along inlet pipe 9 to be mixed with the flowing ventilated methane gas. (The ventilated methane gas may be mixed with air as necessary.) The mixture is introduced into the combustion chamber 44 through the inlet valve 41 and ignited by the flame jet 44a (see FIG. 1) spouting from ignition device 11 to be burned in the combustion chamber 44.

The working of the combustion diagnosis apparatus will be explained below.

The gas pressure in the combustion chamber 44 detected by cylinder pressure detector 1 is inputted to noise filter 3. Noise filter 3 is composed of a super low-pass filter in the combustion diagnosis apparatus 100, such that high frequency noises are filtered. The cylinder pressure signal smoothed through the filtration is amplified by amplifier 4 to be inputted to combustion diagnosis section 5.

The crank angle signal from crank angle detector 2 is also entered into combustion diagnosis section 5.

Next, an example of combustion diagnosis operation by combustion diagnosis apparatus 100 will be explained with reference to the combustion control flowchart shown in FIG. 3 and cylinder pressure curve shown in FIG. 4.

Figure 4:
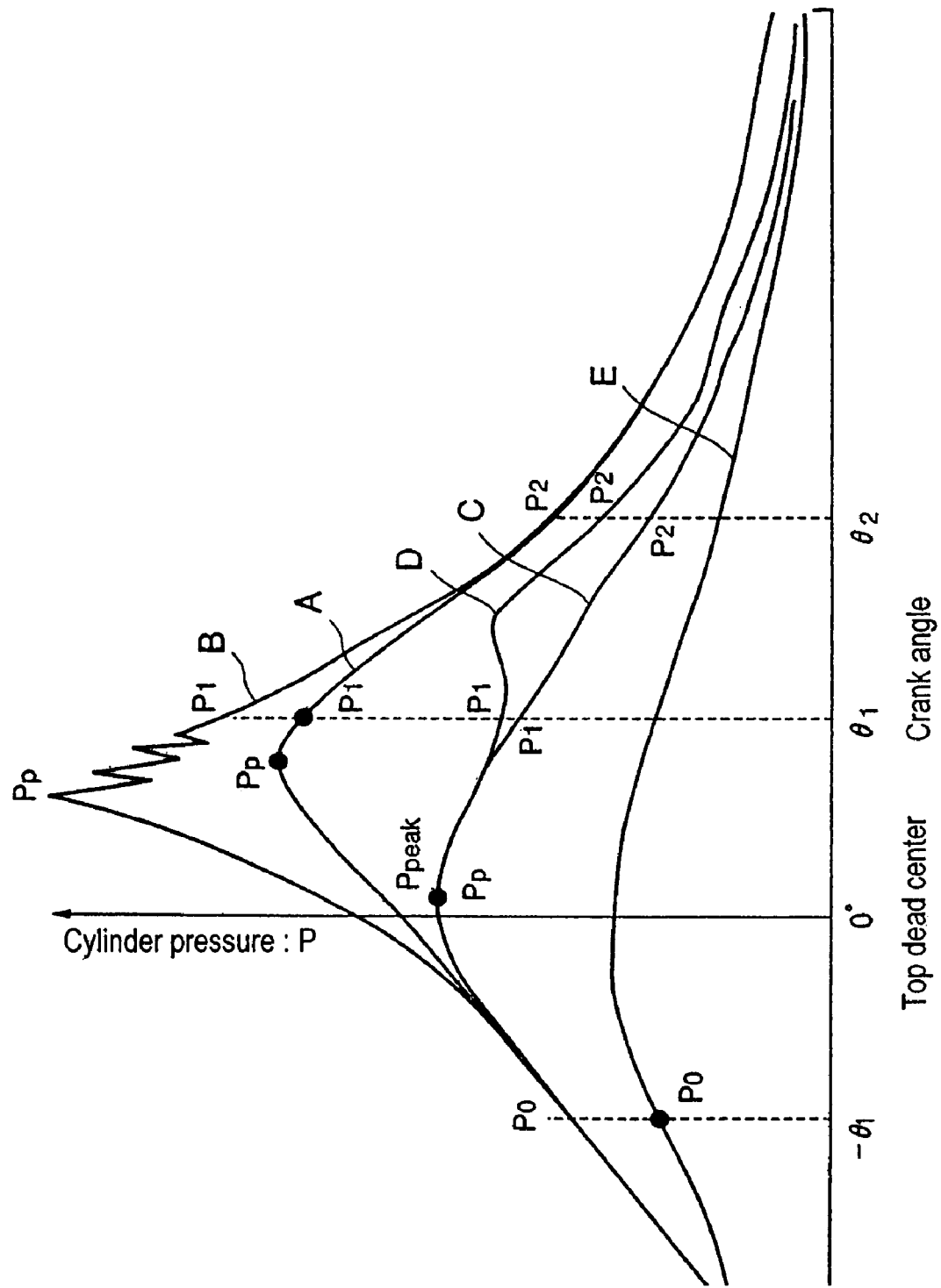
FIG. 4 is a diagram showing the relation of cylinder pressure to crank angle of said gas engine.

The cylinder pressure-crank angle curve, as shown in FIG. 4, is obtained in combustion diagnosis section 5 from the cylinder pressure inputted from cylinder pressure detector 1 and the crank angle inputted from crank angle detector 2. It should be understood that curve A is a cylinder pressure curve representing normal combustion.

Figure 3:
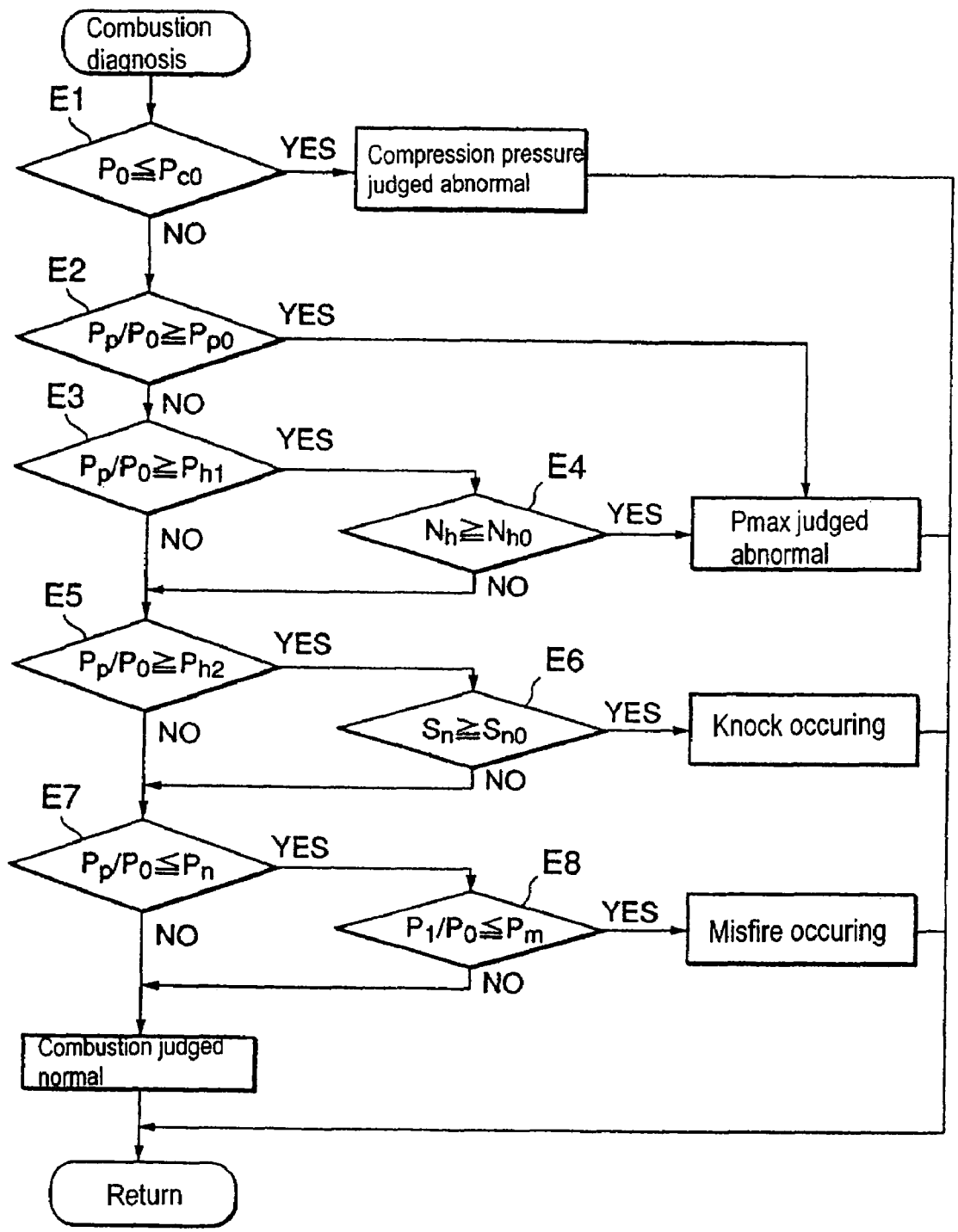
FIG. 3 is an example of control flowchart of said gas engine.

Referencing FIG. 3, initially compression pressure $P_0$ at a predetermined crank angle in the compression stroke, shown in FIG. 4, is compared E1 in a compression pressure judging means (step) with a predetermined permissible compression pressure $P_{c0}$. $P_{c0}$ is the minimum permissible pressure in the compression stroke. The compression pressure judging means determines whether the compression pressure $P_0$ is abnormally low compared to the normal value. Compression pressure $P_0$ may be abnormally low due to troubles such as gas leakage or mechanical troubles and is considered abnormally low when it is equal to or lower than the permissible compression pressure $P_{c0}$, i.e. when $P_0 \leq P_{c0}$. Curve E, shown in FIG. 4 is a cylinder pressure curve when the compression pressure is abnormally low.

Next, as shown in FIG. 3, the ratio of the maximum cylinder pressure $P_p$ to compression pressure $P_0$ at a predetermined crank angle in the compression stroke $P_p/P_0$ is calculated. The calculated maximum pressure ratio $P_p/P_0$ is compared in a maximum cylinder pressure judging means (step) with a predetermined permissible maximum pressure ratio $P_{p0}$. It should be understood that $P_{p0}$ is the maximum permissible pressure ratio. The maximum cylinder pressure $P_p$, sometimes is considered abnormally high compared to the design value (normal value) when the calculated maximum pressure ratio $P_p/P_0$ is determined E2 to be equal to or greater than permissible maximum pressure ratio $P_{p0}$, i.e. when $P_p/P_0 \geq P_{p0}$. Additionally, the maximum cylinder pressure $P_p$ may be considered abnormally high when the number of operation cycles $N_h$ in which the maximum pressure ratio $P_p/P_0$ is determined E3 to be equal to or greater than a predetermined pressure ratio $P_{h1}$, i.e. when $P_p/P_0 \geq P_{h1}$, is determined E4 equal to or greater than a permissible number $N_{h0}$, i.e. when $N_h \geq N_{h0}$.

When the maximum cylinder pressure $P_p$ is determined to be normal, a knock judging means (step) determines E5 whether a knock is occurring in combustion chamber 44. Specifically, the knock judging means determines E6 whether the number of cycles $S_n$ in which maximum pressure ratio $P_p/P_0$ is equal to or greater than a predetermined permissible pressure ratio of knock $P_{h2}$, i.e. when $P_p/P_0 \geq P_{h2}$, is equal to or greater than a permissible number of cycles $S_{n0}$, i.e. when $S_n \geq S_{n0}$. Curve B, as shown in FIG. 4, is a cylinder pressure curve when knock has occurred. When it has been determined that knock is occurring, gas supply valve 7 is adjusted to decrease the supply of recovered methane gas.

When it has been determined that knock is not occurring, a misfire judging means (step) determines E7 whether the maximum pressure ratio $P_p/P_0$ is equal to or less than a predetermined minimum permissible pressure ratio $P_n$, i.e. when $P_p/P_0 \leq P_n$. The misfire judging means also determines E8 whether the combustion pressure ratio $P_1/P_0$ is equal to or less than the predetermined permissible pressure ratio $P_m$ of misfire, i.e. when $P_1/P_0 \leq P_m$. When the misfire judging means determines that $P_p/P_0 \leq P_m$ and that $P_1/P_0 \leq P_m$ misfire is occurring. When misfire occurs, gas supply valve 7 is adjusted to increase the supply of recovered methane gas. It should be understood that the combustion pressure ratio $P_1/P_0$ is the ratio of a pressure $P_1$ at a predetermined crank angle in the combustion stroke to the pressure $P_0$ at a predetermined crank angle in the compression stroke as shown in FIG. 4.

A predetermined crank angle $\theta_1$ in the combustion stroke, corresponding to where pressure $P_1$ is detected, is determined to be at a position of crank angle symmetric with a position of a predetermined crank angle $-\theta_1$ in the compression stroke, corresponding to where pressure $P_0$ is detected, and about a top dead center, as shown in FIG. 4.

Thus, more accurate combustion control can be achieved by using pressure ratios, instead of pressure itself, such that combustion conditions are determined and controlled.

Figure 5:
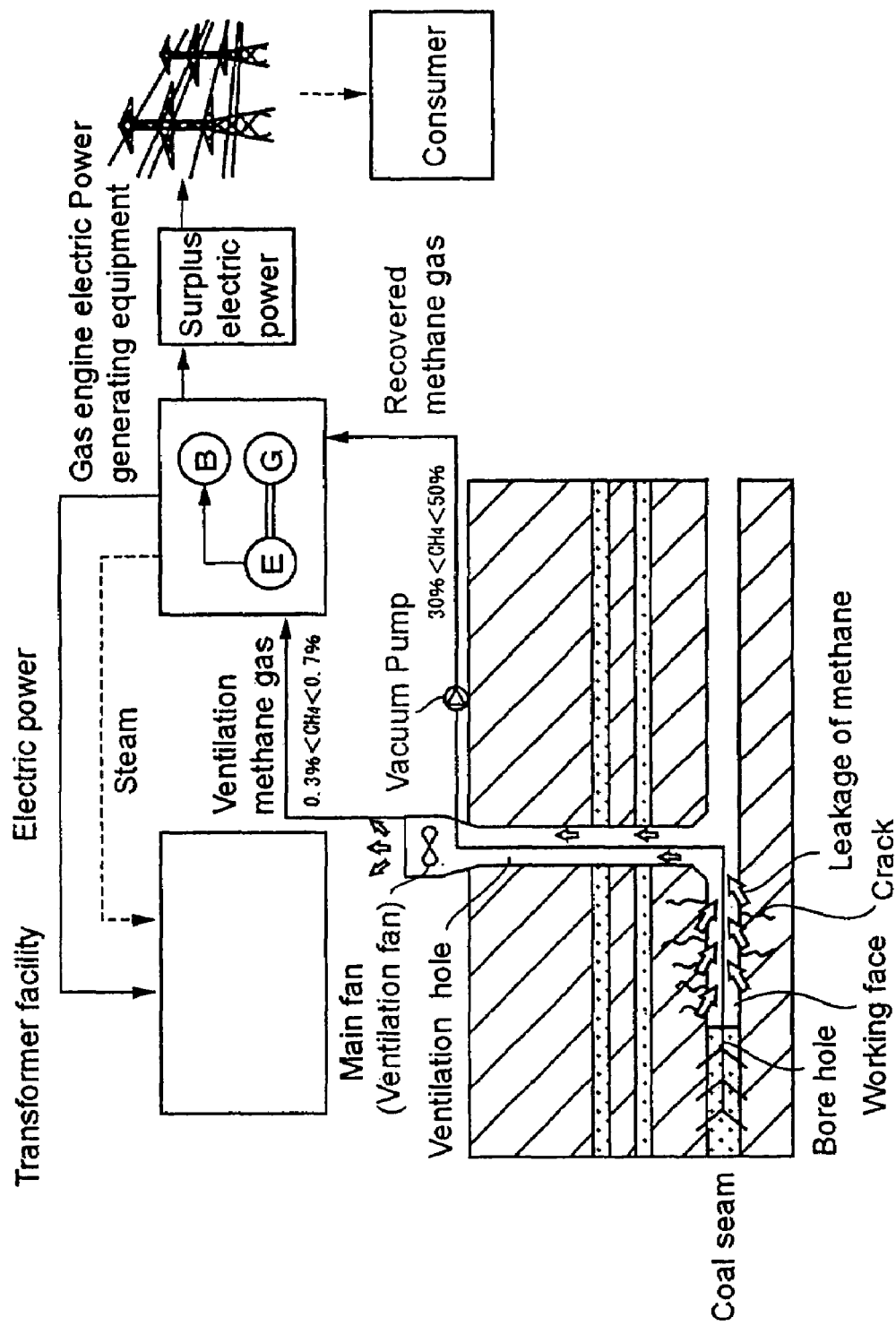
FIG. 5 is a conceptual rendering showing a combination of a coal mine methane gas and the system according to the present invention.

The electric generating system adopting a methane gas engine E is explained with reference to FIG. 5. Gas engine E is installed near a coal mine and recovered methane gas is supplied as fuel to the gas engine through piping.

More specifically, ventilated methane gas exhausted from the mine cavity and the coal face, together with ventilation air, is introduced to the inlet pipe of engine E.

Gas engine E can be connected with an electric generator G, and exhaust gas of gas engine E can be introduced to a boiler B to produce steam that is used for powering utility equipment on the mine premises. The electric power generated by generator G is used for powering utility equipment on the mine premises by way of a transformer facility and surplus electric power is supplied through power lines and sold to users as commercial electric power.

The exhaust gas from boiler B is released to the atmosphere. However, in this case, carbon dioxide produced by the combustion of coal mine methane gas is released as the exhaust gas. As the greenhouse effect index of methane is 21 and that of $CO_2$ is 1, the reduction of 20 times the greenhouse effect index of carbon dioxide is achieved. This reduction of greenhouse effect index can be traded as carbon dioxide emission credit.

Figure 6:
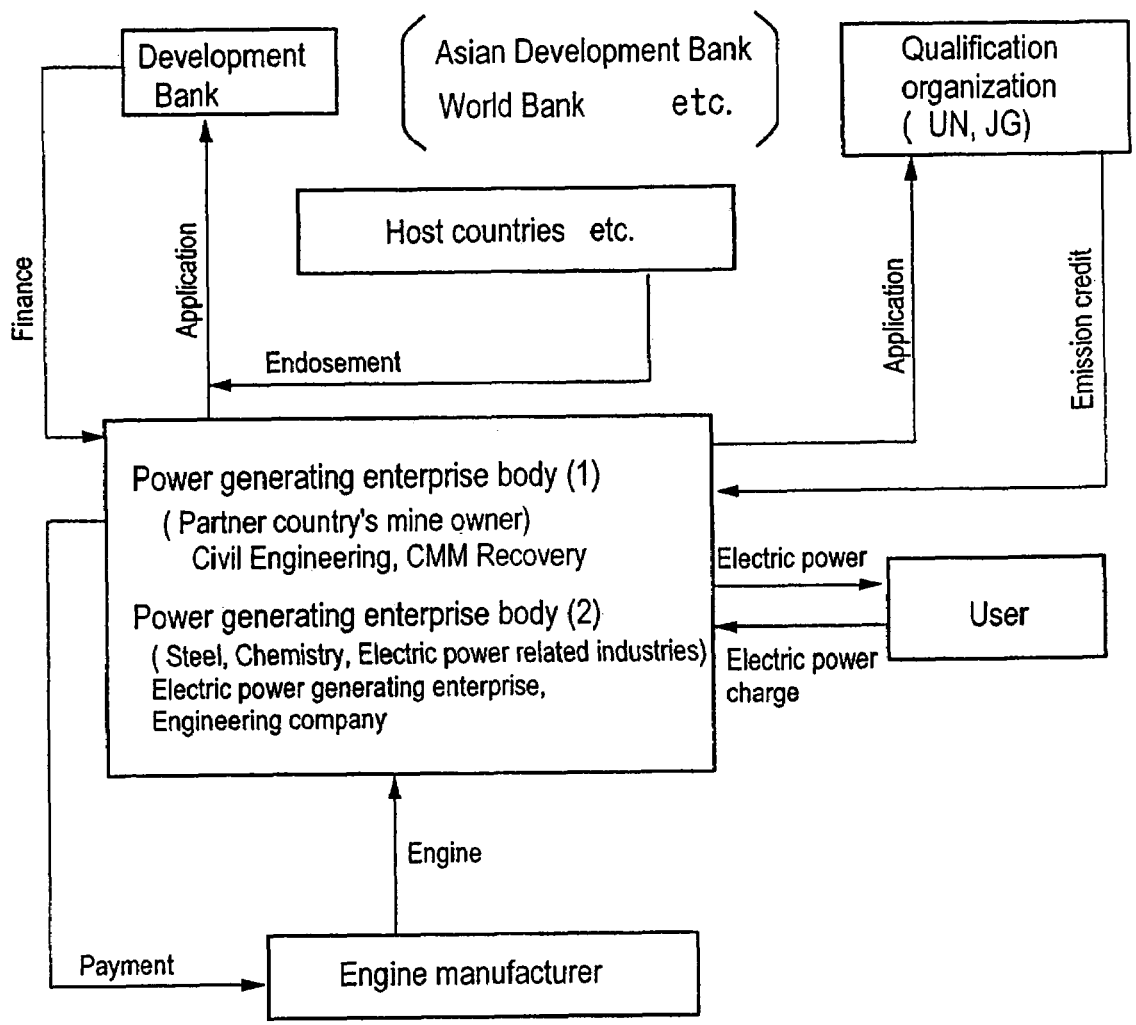
FIG. 6 is a conceptual rendering showing a business model of carbon dioxide credit trade.

A business model of the gas engine electric generating system is explained with reference to FIG. 6. The business model is for establishing a gas engine electric generating system in a coal mine in China, for example.

Enterprising bodies of the gas engine electric power generating system could be government-owned enterprises, mine owner companies, owners of steel, chemistry, electric power related enterprises, engineering companies and the like. The enterprising bodies may be institutions specifically established for constructing the electric power generation system.

The enterprising body applies to the World Bank or ODA of Japan, etc. for financing or loan aid, and at the same time applies for credit approval on the condition that that it establishes the gas engine electric power generating system in a coal mine in China. Approval is to be awarded by a CDM Committee or the Committee of Article 6. The endorsement by the host country and acknowledgement by the investing country are necessary. It should be understood that the investing country could be other than Japan. Upon applying, if carbon dioxide emission credit is offered as security, the enterprising body can get funding easier.

The enterprising body reports to the U.N. or the Japanese Government of the reduction of greenhouse effect index and registers this carbon dioxide emission credit on the emission credit market to prepare for trading with credit surcharge payment obligators.

After getting financing from the Asian Development Bank, etc., the enterprising body purchases the principal parts and assembles the gas engine electric power generating system.

The enterprising body can get not only profit through selling the electricity produced by the operation of the gas engine electric power generating system, but also can achieve the reduction of 20 times the greenhouse effect index of carbon dioxide. With the profit obtained from selling the carbon dioxide emission credit to credit surcharge payment obligators on the market, the loan can be paid off in a short period. Thus, the enterprising body can get profit dually.

The table of FIG. 7 shows a worldwide spreading effect of the implementation of the present invention. In the left column of the table, regional total amounts of coal mine methane gas emissions in the world are shown.

If it is assumed that each country utilizes one third of recovered methane gas for the gas engine electric power generation system, generation capacity is 5180 MW and production of electric power is 45 billion kWh/year. This corresponds to the production of 50~100 large nuclear power plants. A reduction of 20 million ton/year of $CO_2$ can be achieved, which corresponds to 20% of the total annual amount of $CO_2$ emissions of Japan.

The invention claimed is:

1. A gas engine electric power generating system comprising:
    an electric power generating apparatus including an electric power generator coupled to a pilot fuel oil ignition type gas engine having at least one cylinder and a cylinder pressure detector;
    a combustion diagnosis apparatus for diagnosing a combustion condition within the gas engine in response to a cylinder pressure detector signal;
    a combustion controller that adjusts a fuel mixture comprising recovered methane gas having a methane concentration of 30-50% and ventilated methane gas having a methane concentration of 0.3-0.7% in the gas engine in response to a combustion condition signal from said combustion diagnosis apparatus; and
    a gas injection device that provides the fuel mixture for introduction into the cylinder while mixing the recovered methane gas and the ventilated methane gas to define a lean methane/air mixture having a methane concentration of 3-5% and having an air excess ratio not less than 2, such that the gas engine operates to produce electric power.

2. A gas engine electric power generating system in accordance with claim 1 wherein said combustion controller adjusts the fuel mixture by comparing a maximum pressure ratio defined as $P_p/P_o$ against predetermined pressure ratios each corresponding to at least one of a plurality of diagnoses, where $P_p$ is a maximum cylinder pressure in a cycle and $P_o$ is a compression pressure for at least one predetermined crank angle in a compression stroke, to facilitate preventing engine knock and engine misfire.

3. A gas engine electric power generating system in accordance with claim 1 further comprising a coal mine that supplies the recovered methane gas and the ventilated methane gas.

4. A gas engine electric power generating system, said system comprising:
    an electric power generator coupled to a pilot fuel oil ignition type gas engine having at least one cylinder and a cylinder pressure detector;
    means for diagnosing a combustion condition within the gas engine in response to a signal from the cylinder pressure detector;
    means for adjusting a fuel mixture of recovered methane gas having a methane concentration of 30-50% and ventilated methane gas having a methane concentration of 0.3-0.7% in the gas engine in response to a combustion condition signal from said means for diagnosing a combustion condition; and means for introducing the fuel mixture into the cylinder while mixing the recovered methane gas and the ventilated methane gas to define a lean methane/air mixture having a methane concentration of 3-5% and having an air excess ratio not less than 2.

5. A gas engine electric power generating system in accordance with claim 4 wherein said means for adjusting the fuel mixture further comprises comparing a maximum pressure ratio defined as $P_p/P_o$ against predetermined pressure ratios each corresponding to at least one of a plurality of diagnoses, where $P_p$ is a maximum cylinder pressure in a cycle and $P_o$ is a compression pressure for at least one predetermined crank angle in a compression stroke, and facilitates preventing engine knock and engine misfire.

6. A gas engine electric power generating system in accordance with claim 4 further comprising a coal mine that supplies the recovered methane gas and the ventilated methane gas.

* * * * *